United States Patent
Parlour et al.

(10) Patent No.: US 8,572,432 B1
(45) Date of Patent: Oct. 29, 2013

(54) METHOD AND APPARATUS FOR PROCESSING AN EVENT NOTIFICATION IN A CONCURRENT PROCESSING SYSTEM

(75) Inventors: David B. Parlour, Fox Chapel, PA (US);
Jorn W. Janneck, San Jose, CA (US);
Ian D. Miller, Charlotte, NC (US)

(73) Assignee: Xilinx, Inc., San Jose, CA (US)

( * ) Notice: Subject to any disclaimer, the term of this patent is extended or adjusted under 35 U.S.C. 154(b) by 433 days.

(21) Appl. No.: 12/417,069

(22) Filed: Apr. 2, 2009

(51) Int. Cl.
*G06F 11/00* (2006.01)
*G06F 11/18* (2006.01)

(52) U.S. Cl.
USPC .................................. 714/27; 714/25; 714/31

(58) Field of Classification Search
USPC ................ 714/13, 26, 31, 55, 25, 27
See application file for complete search history.

(56) References Cited

U.S. PATENT DOCUMENTS

| | | | |
|---|---|---|---|
| 5,404,503 A * | 4/1995 | Hill et al. ......................... | 714/31 |
| 5,655,069 A * | 8/1997 | Ogawara et al. ................ | 714/10 |
| 7,222,315 B2 | 5/2007 | Schubert et al. | |
| 7,496,869 B1 | 2/2009 | Janneck et al. | |
| 7,607,005 B1 * | 10/2009 | Lewis ........................... | 713/100 |
| 7,640,325 B1 * | 12/2009 | DeKoning et al. ............ | 709/223 |
| 2006/0236209 A1 * | 10/2006 | Aida et al. ...................... | 714/768 |
| 2007/0067673 A1 * | 3/2007 | Avizienis ........................ | 714/12 |
| 2009/0106586 A1 * | 4/2009 | Armstrong et al. ............. | 714/13 |
| 2009/0291681 A1 * | 11/2009 | Hara ........................... | 455/422.1 |
| 2010/0042868 A1 * | 2/2010 | Apelbaum et al. ................ | 714/2 |

OTHER PUBLICATIONS

Programming With Assertions by Oracle cached by Google Mar. 31, 2002 http://docs.oracle.com/javase/1.4.2/docs/guide/lang/assert.html.*
Wikipedia's Graphical User Interface retrieved Jan. 20, 2012 http://en.wikipedia.org/wiki/Graphical_user_interface.*
Bolchini et al., "The Design of Reliable Devices for Mission-Critical Applications", IEEE Transactions on Instrumentation and Measurement, vol. 52, No. 6., Dec. 2003, pp. 1703-1712.
U.S. Appl. No. 12/048,588, filed Mar. 14, 2008, Miller, Ian et al., Xilinx, Inc. 2100 Logic Drive, San Jose, CA.

* cited by examiner

*Primary Examiner* — Joseph Schell
(74) *Attorney, Agent, or Firm* — Kin-Wah Tong; Kevin T. Cuenot

(57) ABSTRACT

In one embodiment, a concurrent processing system is disclosed. For example, in one embodiment of the present invention, a concurrent processing system, comprises a first processing element comprising a first monitor module, a second processing element in communication with the first processing element, the second processing element comprising a second monitor module, and a first system monitor for receiving a notification from at least one of: the first processing element, or the second processing element, wherein the notification indicates an event detected by one of the first monitor module, or the second monitor module.

17 Claims, 3 Drawing Sheets

METHOD AND APPARATUS FOR PROCESSING AN EVENT NOTIFICATION IN A CONCURRENT PROCESSING SYSTEM

FIELD OF THE INVENTION

One or more aspects of the present invention relate generally to the implementation of a module in hardware, e.g., derived from an assertion, for increasing the reliability of a concurrent processing system, e.g., an embedded concurrent processing system.

BACKGROUND OF THE INVENTION

As computing processes continue to increase in complexity, various processing systems have deployed concurrent processing elements to handle ever increasing complexity and volume of computations. Although employing concurrent processing elements increases the processing capability of the overall system, it may also require collaboration between the various concurrent processing elements. A simulation of the concurrent processing system can be performed before the concurrent processing system is actually deployed to ensure that the plurality of concurrent processing elements will perform, e.g., will interact with each other properly. However, such simulation may not be able to uncover all potential problems that may arise during the operation of the concurrent processing system.

SUMMARY OF THE INVENTION

In one embodiment, a concurrent processing system is disclosed. For example, in one embodiment of the present invention, a concurrent processing system, comprises a first processing element comprising a first monitor module, a second processing element in communication with the first processing element, the second processing element comprising a second monitor module, and a first system monitor for receiving a notification from at least one of: the first processing element, or the second processing element, wherein the notification indicates an event detected by one of the first monitor module, or the second monitor module. The detected event is derived from an assertion. The system further includes a recovery module, in communication with the system monitor, for issuing at least one recovery action instruction to be taken by the first processing element, or the second processing element. The first processing element comprises a first recover module, and the second processing element comprises a second recover module, and wherein the at least one recovery action instruction is provided to the first recover module or the second recover module. The first system monitor determines that the event has caused a dataflow stall or a dataflow lock. The at least one recovery action instruction is tailored to address a particular problem caused by the event without having to reset the first processing element, or the second processing element. Each of the first processing element and the second processing element comprises a portion of a programmable logic device (PLD). Each of the first processing element and the second processing element comprises a programmable logic device (PLD). Each of the first processing element and the second processing element comprises a plurality of programmable logic devices (PLDs). Each of the first processing element and the second processing element comprises a programmable portion of an integrated circuit. The first system monitor provides a second notification to a second system monitor located external to the concurrent processing system. The first system monitor and the second system monitor have a hierarchical relationship.

In another embodiment, a method for processing a notification is disclosed. For example, in the other embodiment of the present invention, the method comprises receiving a notification from at least one of: a first processing element comprising a first monitor module, or a second processing element comprising a second monitor module, where the first processing element and the second processing element are deployed in a concurrent processing system, and where the notification indicates an event detected by one of the first monitor module, or the second monitor module. The method further includes processing the notification to determine whether at least one recovery action instruction is to be issued to the first processing element or the second processing element.

The detected event is derived from an assertion. The at least one recovery action instruction is provided to a first recover module or a second recover module. The event is determined to have caused a dataflow stall or a dataflow lock. The at least one recovery action instruction is tailored to address a particular problem caused by the event without having to reset the first processing element, or the second processing element. Each of the first processing element and the second processing element comprises at least one of: a portion of a programmable logic device (PLD), a programmable logic device (PLD), a plurality of programmable logic devices (PLDs), or a programmable portion of an integrated circuit. The method further comprises providing a second notification to a system monitor located external to the concurrent processing system.

In yet another embodiment of the present invention, a computer-readable medium is disclosed. The medium has stored thereon two or more instructions, the instructions including instructions which, when executed by a processor, cause the processor to perform the steps of a method for setting gradations of alarm thresholds in a communication network. The method includes receiving a notification from at least one of: a first processing element comprising a first monitor module, or a second processing element comprising a second monitor module, where the first processing element and the second processing element are deployed in a concurrent processing system, and where the notification indicates an event detected by one of the first monitor module, or the second monitor module. The method further includes processing the notification to determine whether at least one recovery action instruction is to be issued to the first processing element or the second processing element.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
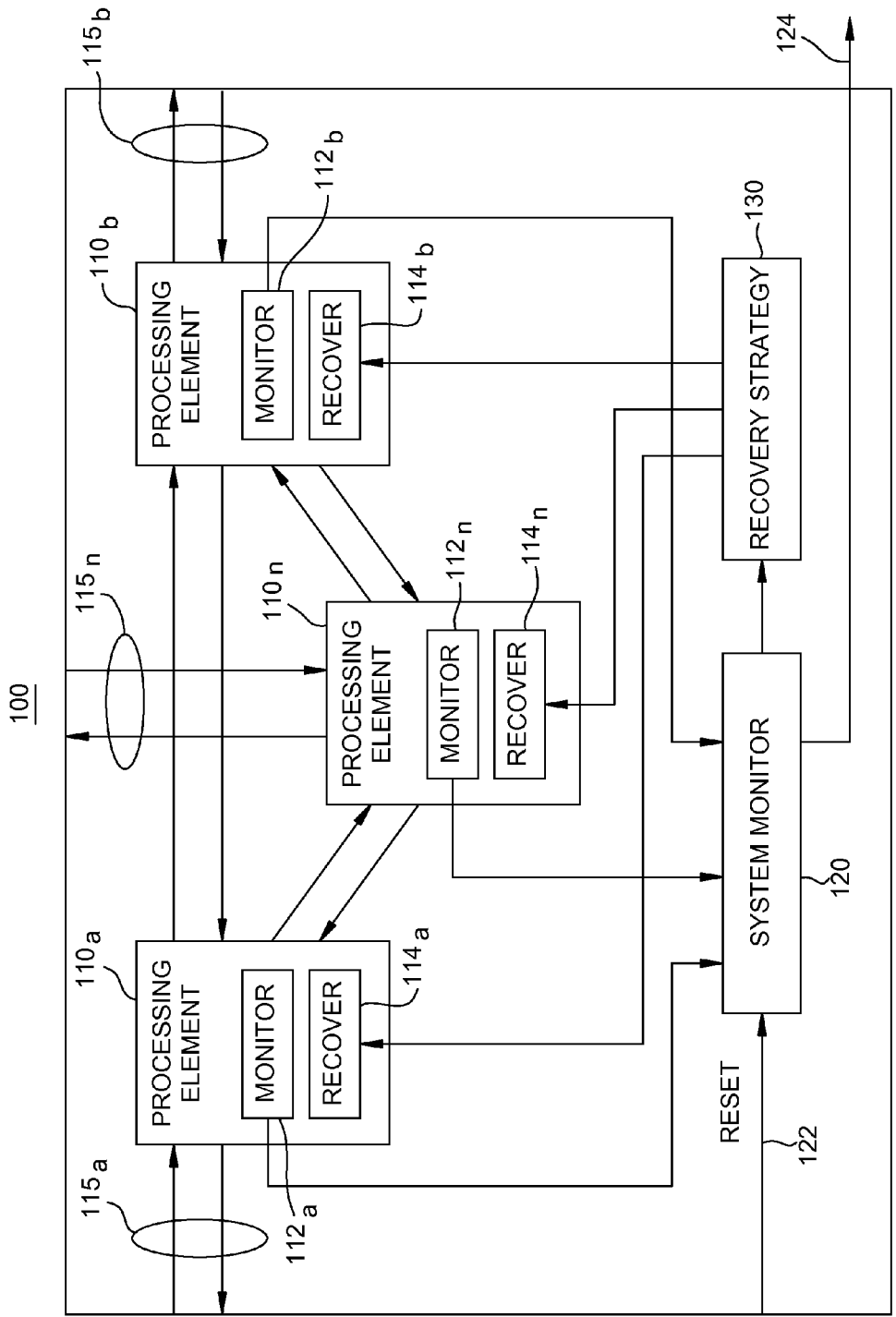
FIG. 1 illustrates an illustrative overview of a concurrent processing system in accordance with one or more embodiments of the present invention.

FIG. 1 illustrates an illustrative overview of a concurrent processing system 100 in accordance with one or more embodiments of the present invention. In one embodiment, the concurrent processing system 100 employs a plurality of processing elements or nodes $110_a$-$110_n$. The plurality of processing elements or nodes $110_a$-$110_n$ is capable of communicating with other devices, modules, and/or systems outside of the concurrent processing system 100 via communication paths $115_{a-n}$. Although only three processing elements are shown in FIG. 1, an embodiment of the present invention is not so limited. Any number of processing elements can be employed.

In one embodiment, each of the processing elements can be a portion of a larger processing unit, e.g., a processor, co-processor, a controller, an application specific integrated circuit (ASIC), a programmable logic device (PLD), e.g., a Field Programmable Gate Array (FPGA), and the like. Alternatively, in one embodiment, each of the processing elements can be an entire processing unit, e.g., a processor, a co-processor, a controller, an ASIC, or a PLD. In yet another embodiment, each of the processing elements can be a plurality of processing units, e.g., a plurality of processors, a plurality of co-processors, a plurality of controllers, a plurality of ASICs, a plurality of PLDs, and the like.

Furthermore, each processing system 100, in turn, may be coupled to a plurality of other processing systems (not shown), e.g., in a hierarchical configuration or architecture. For example, in the hierarchical configuration one processing system 100 may interact with another processing system in a higher layer (e.g., a parent layer), whereas the processing system at the parent layer may interact with another processing system at a next higher layer (e.g., a grandparent layer), and so on. Each layer of the overall hierarchical configuration or architecture may employ one or more processing systems. The advantage of this hierarchical configuration or architecture will be further described below.

In one embodiment, each processing element (herein simply referred to as processing element 110) is executing a process that is substantially independent from other processes that are being executed by other processing elements. However, since the processing elements are deployed in a concurrent processing system 100, the processing elements will need to interact with each other at some level, e.g., receiving inputs or providing outputs to each other. However, such cooperation between the various processing elements may create problems such as dataflow stall (e.g., a condition where the processing element is no longer performing a process, e.g., because it is waiting for the occurrence of an event, such as receiving the necessary input, waiting for a condition to be satisfied, and the like) or dataflow lock (e.g., where a process has locked completely, e.g., because the processing element has received an input that it did not expect and there was no previous provision to handle such exceptions, e.g., division by a zero value). Often, such problems may not be immediately detected and even if it is detected, the remedial measure is often to apply a hard reset to the entire system, e.g., rebooting the entire concurrent processing system 100. Such remedial measure is unduly severe and may create significant delay since the function of the concurrent processing system 100 will be interrupted until the system is rebooted.

To address such criticality, in one embodiment of the present invention, each of the processing elements $110_a$-$110_n$ includes a monitor module such as a monitor logic module $112_{a-n}$ and a recover module such as recover logic module $114_{a-n}$, respectively. Again, each monitor logic module will simply be referred to as monitor logic module 112 and each recover logic module will simply be referred to as recover logic module 114. In one embodiment, each monitor logic module 112 is tasked with monitoring the occurrence of a particular event. More specifically, the monitor logic module 112 is implemented to detect one or more conditions that is the subject of one or more assertions. An assertion is broadly defined as a condition or state that must always be true. For example, an assertion is an expression that evaluates to a Boolean value where "true" implies a correct operation and "false" implies incorrect operation. One aspect of the present invention is the implementation of an assertion in a hardware implementation. Although an assertion can be tested during the simulation process, such assertion in the prior art is not implemented in a hardware implementation when a concurrent processing system is actually deployed. Thus, although a simulation may indicate that an assertion was indeed satisfied, the condition defined by the assertion will not be checked via a hardware implementation. As such, when the concurrent processing system is deployed, if and when the condition specified by the assertion unexpectedly occurs, the concurrent processing system may not be equipped to address such exceptions.

For example, in operation, each monitor logic module 112 is tasked with monitoring for the occurrence of one or more conditions or events. Once the occurrence of the monitored event is detected, each monitor logic module 112 will provide a notification to a system monitor 120 (e.g., a system monitor logic module). In turn, if necessary, the system monitor 120 will provide the proper signal to the appropriate recover logic module 114 to implement one or more remedial measures. One aspect of the present invention is that since each processing element is operating concurrently and mostly independently from other processing elements, it may not have the ability to diagnose the existence or cause of a particular problem.

To illustrate, if processing element $110_a$ is receiving input data from processing element $110_b$, but processing element $110_a$ is currently overloaded, processing element $110_a$ may issue a request to processing element $110_b$ to temporarily suspend operation. In turn, processing element $110_b$ will cease to provide further inputs to processing element $110_a$. However, if processing element $110_b$ is receiving inputs from processing element $110_c$, then processing element $110_b$ may in turn issue a request to processing element $110_c$ to temporarily suspend operation. Finally, if processing element $110_c$ is receiving inputs from processing element $110_a$, then processing element $110_c$ may in turn issue a request to processing element $110_a$ to temporarily suspend operation. In this illustrative scenario, the processing element $110_a$ that initially caused the start of the suspension event that cascaded through the entire concurrent processing system 100 will not be able to terminate the suspension "loop", i.e., a dataflow stall, that it created.

In one embodiment, since the system monitor 120 is able to receive notifications from a plurality of processing elements, it will be able to properly assess whether there is a problem that will require a remedial action to be taken. For example, using the above example, each of the monitor logic modules may employ a timer that will trigger a notification to be sent to the system monitor 120 if the processing element is idle for a predefined interval of time. If available, the notification may include the cause that triggered the idling of the processing element. Since the system monitor will receive notifications from all three processing elements, it will be able to detect that a dataflow stall has occurred. As illustrated above, each of the processing elements will be incapable of detecting that a problem has occurred, whereas the system monitor 120 will be in a better position to diagnose the occurrence of a dataflow stall.

Furthermore, since the system monitor 120 is able to detect how the dataflow lock originated, e.g., processing element 110$_a$ was initially overloaded, the system monitor 120 is also in a better position to determine what is the most appropriate remedial action that should be taken to address the detected problem. In one embodiment, the system monitor 120 may provide the cause of the dataflow lock to the recovery strategy logic module 130 (broadly, a recovery module). In turn, the recovery strategy logic module 130 will select and instruct one or more remedial actions (e.g., via at least one recovery action instruction) to be taken via the pertinent recover logic module 114. Using the example above, the recovery strategy logic module 130 may instruct the processing element 110$_a$ to resume operation for a number of computational cycles or after the overload condition has been alleviated. The processing element 110$_a$ should then send a request to the processing element 110$_b$ to resume operation and so on. Eventually, the dataflow stall will be resolved. As can be seen from this illustrative example, one or more embodiments of the present invention also provides the ability to implement a plurality of remedial actions (e.g., granularity of remedial actions). In other words, by knowing the cause of a particular problem, one or more embodiments of the present invention allows an appropriate remedial action to be taken instead of the more drastic approach where a reset signal (e.g., via signaling path 122) is sent to reset all of the processing elements within the concurrent processing system 100. However, it should be noted that one or more embodiments of the present invention does not prohibit the use of the reset signal, but only that one or more embodiments of the present invention will only employ the reset signal if it is needed to reset one or more processing elements.

In another example, a processing element 110 may enter into a lock condition, e.g., a dataflow lock. A dataflow lock is broadly defined as the condition or state where no action can be taken further, e.g., the output queue being full and the consuming process that reads data from the output queue is in a state that is incapable of reading data from the output queue, division by a zero value and the like. Under the dataflow lock scenario, the processing element 110 is not stalled, but nevertheless, is unable to proceed with the current process.

To illustrate, processing element 110$_a$ may require a particular input value (e.g., any value greater than 1) from processing element 110$_b$. However, if processing element 110$_b$ having experienced an intermittent error, e.g., a memory error where a value was corrupted, then a value less than 1 may possibly be generated and inadvertently sent to processing element 110$_a$. Since processing element 110$_a$ was expecting a value greater than 1 and no exception handling procedure was provided to address this exception, processing element 110$_a$ may enter into a dataflow lock condition.

In one embodiment of the present invention, using the above example, the monitor logic module 112 will send a notification to the system monitor 120 reporting the dataflow lock event, and if available, the cause of the dataflow lock event. The system monitor 120 will be able to determine that it is the processing element 110$_b$ that caused the dataflow lock condition to occur in processing element 110$_a$. In response to this diagnosis, the recovery strategy logic module 130 may instruct one or more of the following remedial actions: instructing processing element 110$_b$ to provide another input value, instructing processing element 110$_b$ to reset one or more memory locations before providing another input value, instructing processing element 110$_a$ to ignore the current input value and wait for another input value, and so on. Again, one or more embodiments of the present invention is able to provide a high level of granularity in terms of the possible remedial actions that can be taken to address a particular dataflow lock event in a concurrent processing system.

Finally, the system monitor 120 may, in turn, provide a notification via communication path 124 to another device or module, e.g., another system monitor (not shown). As discussed above, one or more embodiments of the present invention contemplates the deployment of a plurality of concurrent processing systems 100 in a hierarchical architecture. For example, one or more concurrent processing systems 100 may operate at the block level, whereas another concurrent processing system 100 may operate at a frame level (e.g., a frame having a plurality of blocks), whereas another concurrent processing system 100 may operate at a group of frames level and so on. Similar to the various examples provided above, it is possible that the system monitor 120 of a particular concurrent processing system is unable to diagnose the cause of a particular problem occurring within the concurrent processing system 100. However, in reporting a problem to a higher layer, it is possible that an external concurrent processing system at a higher level is able to properly diagnose the cause of the problem experienced by a lower layer concurrent processing system 100.

Figure 2:
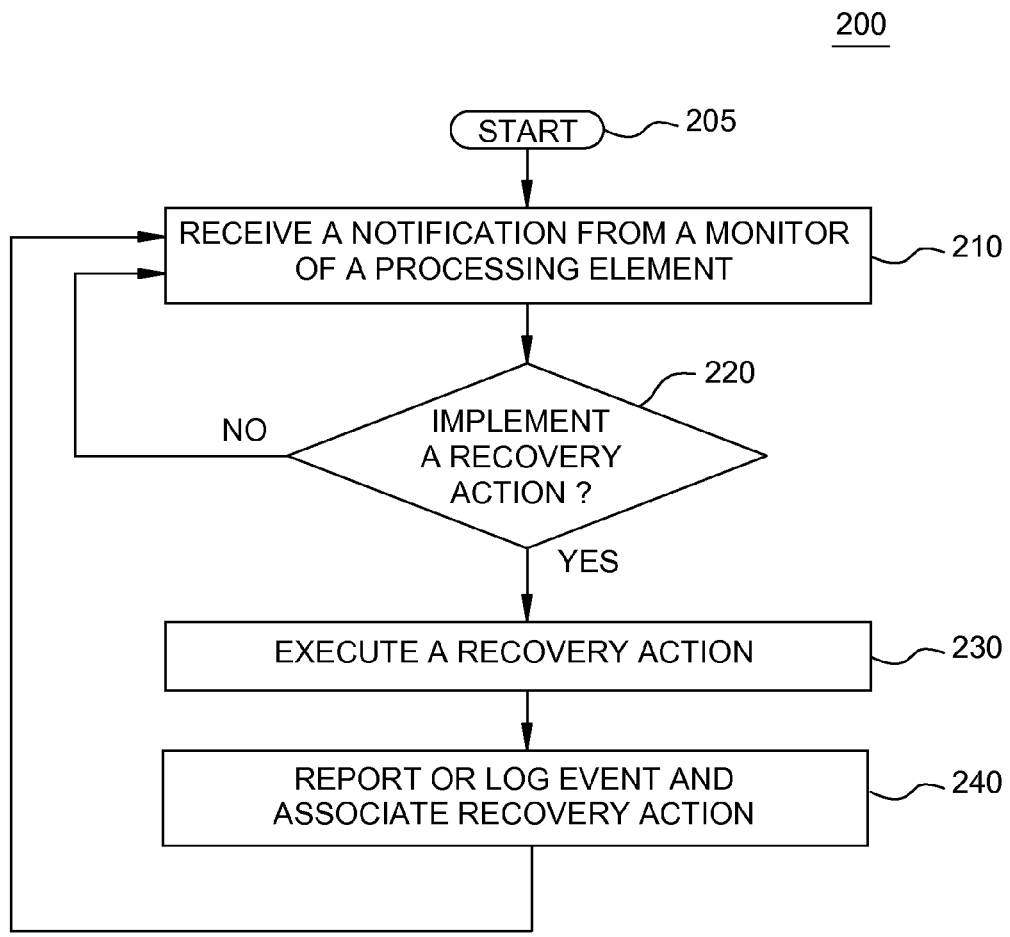
FIG. 2 illustrates a flow chart of a method for processing one or more notifications from one or more concurrent processing elements in accordance with one or more embodiments of the present invention.

FIG. 2 illustrates a flow chart of a method 200 for processing one or more notifications from one or more concurrent processing elements in accordance with one or more embodiments of the present invention. For example, one or more steps of method 200 can be implemented by a system monitor 120. Method 200 starts in step 205 and proceeds to step 210.

In step 210, method 200 receives a notification from a processing element of a concurrent processing system. For example, the notification may indicate that an occurrence of a monitored event has been detected.

In step 220, method 200 determines whether a recovery or remedial action is required to be executed. If the query is negatively answered, then method 200 returns to step 210. For example, method 200 may not be able to diagnose the problem at the present time and is not able to recommend the execution of a particular remedial action, e.g., the system monitor may need one or more additional notifications from other processing elements. However, if the query is positively answered, then method 200 proceeds to step 230.

In step 230, method 200 executes one or more recovery or remedial actions. For example, the system monitor 120 in cooperation with the recovery strategy logic module 130 may cause one or more remedial actions to be executed at one or more processing elements.

In step 240, method 200 may optionally report or log the occurrence of a particular problem and the necessary remedial action that was taken to address the detected problem. The method 200 may also record whether the remedial action was effective in addressing the detected problem. This step allows historical records to be maintained for providing various reporting features. Furthermore, the historical records may also assist the system monitor in diagnosing problems that may have been previously addressed. Method 200 then returns to step 210.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision, do not necessarily require that both branches of the determining operation be practiced. In other words, one of the branches of the determining operation can be deemed as an optional step.

Figure 3:
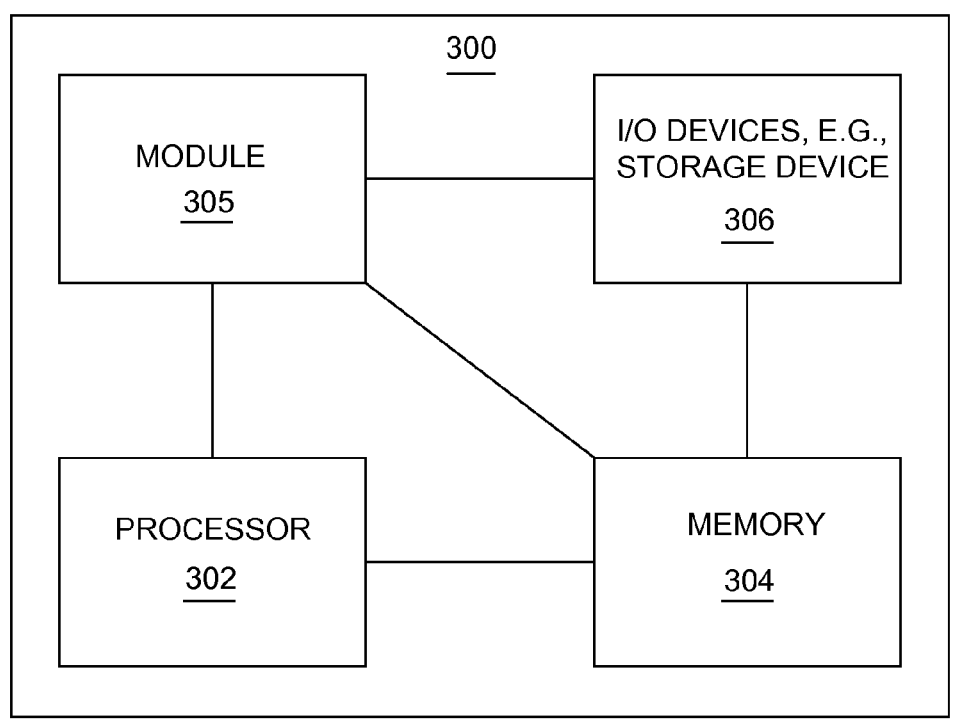
FIG. 3 illustrates a high level block diagram of a general purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for processing one or more notifications from one or more concurrent processing elements, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that one or more embodiments of the present invention can be implemented in software and/or in a combination of software and hardware, e.g., using application specific integrated circuits (ASIC), a general purpose computer or any other hardware equivalents. In one embodiment, the present module 305 for processing one or more notifications from one or more concurrent processing elements can be loaded into memory 304 and executed by processor 302 to implement the functions as discussed above. As such, the present method 305 for processing one or more notifications from one or more concurrent processing elements (including associated data structures) of one or more embodiments of the present invention can be stored on a computer readable medium, e.g., RAM memory, magnetic or optical drive or diskette and the like.

Furthermore, in one embodiment, one or more aspects of the present invention relate generally to a programmable logic device (PLD). A programmable logic device (PLD) is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources.

In one embodiment, one or more processing elements as shown in FIG. 1 can be implemented as portions of a PLD, or one or more PLDs. For example, the processing elements $110_{a-n}$ can be implemented on a single PLD, or each of the processing elements is a single PLD.

Furthermore, each of the processing elements may be implemented as a programmable portion of an integrated circuit. In other words, the integrated circuit does not have to be implemented as a PLD.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A concurrent processing system, comprising:
a first processing element comprising a first monitor module;
a second processing element in communication with said first processing element, said second processing element comprising a second monitor module;
a first system monitor for receiving a notification, wherein a source of said notification is at least one of: said first processing element, or said second processing element, wherein said notification indicates an event detected by one of said first monitor module, or said second monitor module, and wherein said event is derived from an assertion specifying a condition that must always be true; and
a recovery module in communication with said system monitor, wherein said recovery module is configured to issue at least one recovery action instruction to said source specifying a remedial action that is implemented by said source, wherein said at least one recovery action instruction is tailored to address a particular problem caused by said event without having to reset said source;
wherein said first processing element comprises a first recover module, and said second processing element comprises a second recover module, and wherein said at least one recovery action instruction is provided to said first recover module or said second recover module;
wherein said first recover module or said second recover module implements said remedial action responsive to said at least one recovery action instruction; and
wherein the remedial action is ignoring a current input value and awaiting another input value.

2. The system of claim 1, wherein said first system monitor determines that said event has caused a dataflow stall or a dataflow lock.

3. The system of claim 1, wherein each of said first processing element and said second processing element comprises a portion of a programmable logic device (PLD).

4. The system of claim 1, wherein each of said first processing element and said second processing element comprises a programmable logic device (PLD).

5. The system of claim 1, wherein each of said first processing element and said second processing element comprises a plurality of programmable logic devices (PLDs).

6. The system of claim 1, wherein each of said first processing element and said second processing element comprises a programmable portion of an integrated circuit.

7. The system of claim 1, wherein said first system monitor provides a second notification to a second system monitor located external to said concurrent processing system, wherein said second system monitor is a device or module.

8. The system of claim 7, wherein said first system monitor and said second system monitor have a hierarchical relationship.

9. The system of claim 1, wherein the assertion is an expression that evaluates to a Boolean value in which "true" implies a correct operation and "false" implies an incorrect operation.

10. The system of claim 1, wherein the notification includes a cause of the event.

11. The system of claim 10, wherein the recovery module sends the at least one recovery action responsive to a diagnosis received from the first system monitor.

12. The system of claim 1, wherein the remedial action is resuming operation for a number of computational cycles.

13. A method for processing a notification, comprising:
receiving the notification, wherein a source of said notification is at least one of: a first processing element comprising a first monitor module, or a second processing element comprising a second monitor module, wherein said first processing element and said second processing element are deployed in a concurrent processing system, wherein said notification indicates an event detected by one of said first monitor module, or said second monitor module, and wherein said event is derived from an assertion specifying a condition that must always be true; and
processing said notification to determine whether at least one recovery action instruction is to be issued to said first processing element or said second processing element, wherein said at least one recovery action specifies a remedial action that is implemented by said first processing element or said second processing element, and wherein said at least one recovery action instruction is tailored to address a particular problem caused by said event without having to reset said source;
wherein said at least one recovery action instruction is provided to a first recover module within said first processing element or a second recover module within said second processing element;
wherein said first recover module or said second recover module implements said remedial action responsive to said at least one recovery action instruction; and
wherein the remedial action is ignoring a current input value and awaiting another input value.

14. The method of claim 13, wherein said event is determined to have caused a dataflow stall or a dataflow lock.

15. The method of claim 13, wherein each of said first processing element and said second processing element comprises at least one of: a portion of a programmable logic device (PLD), a programmable logic device (PLD), a plurality of programmable logic devices (PLDs), or a programmable portion of an integrated circuit.

16. The method of claim 13, further comprising:
providing a second notification to a system monitor located external to said concurrent processing system, wherein said system monitor is a device or module.

17. A non-transitory computer-readable medium having stored thereon a plurality of instructions, the plurality of instructions including instructions which, when executed by a processor, cause the processor to perform a method for processing a notification, comprising:
receiving the notification, wherein a source of said notification is at least one of: a first processing element comprising a first monitor module, or a second processing element comprising a second monitor module, wherein said first processing element and said second processing element are deployed in a concurrent processing system, wherein said notification indicates an event detected by one of said first monitor module, or said second monitor module, and wherein said event is derived from an assertion specifying a condition that must always be true; and
processing said notification to determine whether at least one recovery action instruction is to be issued to said first processing element or said second processing element, wherein said at least one recovery action specifies a remedial action that is implemented by said first processing element or said second processing element, and wherein said at least one recovery action instruction is tailored to address a particular problem caused by said event without having to reset said source;
wherein said at least one recovery action instruction is provided to a first recover module within said first processing element or a second recover module within said second processing element;
wherein said first recover module or said second recover module implements said remedial action responsive to said at least one recovery action instruction; and
wherein the remedial action is ignoring a current input value and awaiting another input value.

* * * * *